US011052760B2

(12) United States Patent
Vonroth et al.

(10) Patent No.: US 11,052,760 B2
(45) Date of Patent: Jul. 6, 2021

(54) AGRICULTURAL VEHICLE

(71) Applicant: AGCO International GmbH, Neuhausen (CH)

(72) Inventors: Daniel Vonroth, Betzigau (DE); Jan Weigand, Marktoberdorf (DE); Markus Ehrl, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 296 days.

(21) Appl. No.: 16/222,274

(22) Filed: Dec. 17, 2018

(65) Prior Publication Data

US 2019/0184828 A1 Jun. 20, 2019

(30) Foreign Application Priority Data

Dec. 20, 2017 (GB) ..................................... 1721502

(51) Int. Cl.
*B60K 35/00* (2006.01)
*B60K 37/06* (2006.01)
(Continued)

(52) U.S. Cl.
CPC .............. *B60K 35/00* (2013.01); *A01B 76/00* (2013.01); *B60K 37/02* (2013.01); *B60K 37/06* (2013.01);
(Continued)

(58) Field of Classification Search
CPC ..................... B60K 35/00; B60K 37/06; B60K 2370/1537; B60K 2370/122;
(Continued)

(56) References Cited

U.S. PATENT DOCUMENTS 5,235,511 A * 8/1993 Middleton ............ E02F 9/2045
172/4
5,901,535 A * 5/1999 Duckinghaus .......... A01F 29/14
144/242.1

(Continued)

FOREIGN PATENT DOCUMENTS

EP 1714847 A2 10/2006
EP 2557236 A1 2/2013
(Continued)

OTHER PUBLICATIONS

UK Intellectual Property Office, Search Report for related UK Application No. GB1721502.1, dated Jun. 11, 2018.
(Continued)

*Primary Examiner* — Nicole T Verley

(57) ABSTRACT

A vehicle control device incorporating a plurality of vehicle control elements, at least one control apparatus to alter a functionality of the vehicle control elements, each of the vehicle control elements adapted in use to control a valve in a hydraulic line, in which each vehicle control element incorporates a vehicle control display element, the vehicle control display element indicating whether the functionality of the vehicle control element may be altered. This allows a driver when looking at the vehicle control element easily to see from the vehicle control display element whether the functionality of the vehicle control element may be changed.

7 Claims, 1 Drawing Sheet

(51) Int. Cl.
*B60R 16/023* (2006.01)
*B60K 37/02* (2006.01)
*B60Q 3/10* (2017.01)
*A01B 76/00* (2006.01)
*G09G 3/20* (2006.01)
*G09G 3/32* (2016.01)
*G09G 3/3208* (2016.01)

(52) U.S. Cl.
CPC ............ *B60Q 3/10* (2017.02); *B60R 16/0231* (2013.01); *G09G 3/2003* (2013.01); *B60K 2370/122* (2019.05); *B60K 2370/16* (2019.05); *B60K 2370/188* (2019.05); *B60K 2370/33* (2019.05); *B60K 2700/00* (2013.01); *B60Y 2200/22* (2013.01); *G09G 3/32* (2013.01); *G09G 3/3208* (2013.01); *G09G 2320/0666* (2013.01); *G09G 2380/10* (2013.01)

(58) Field of Classification Search
CPC ........ B60K 2370/111; B60K 2370/119; B60K 2370/1523; B60K 2370/61; B60K 2370/12; B60K 2370/135; B60K 2700/00; B60K 2370/188; E02F 9/2012; E02F 9/2004; A01B 76/00
See application file for complete search history.

(56) References Cited

U.S. PATENT DOCUMENTS

| | | | |
|---|---|---|---|
| 7,784,581 | B1 | 8/2010 | Klas et al. |
| 8,257,056 | B2 * | 9/2012 | Peters ................. B66C 23/42 |
| | | | 417/212 |
| 9,665,091 | B2 * | 5/2017 | Jauquet ................ H02J 4/00 |
| 10,802,699 | B2 * | 10/2020 | Brodbeck ............ G06F 3/0416 |
| 10,821,830 | B2 * | 11/2020 | Vonroth ............... E02F 9/2012 |
| 2008/0252600 | A1 * | 10/2008 | Hagner ............ G05G 9/04788 |
| | | | 345/161 |

FOREIGN PATENT DOCUMENTS

| | | |
|---|---|---|
| EP | 2557238 A1 | 2/2013 |
| EP | 2 574 798 A2 | 4/2013 |
| EP | 2923540 A1 | 9/2015 |
| EP | 2 987 672 A1 | 2/2016 |

OTHER PUBLICATIONS

European Patent Office, Search Report for related EP Application No. EP18210803.5, dated May 28, 2019.

* cited by examiner

AGRICULTURAL VEHICLE

BACKGROUND OF THE INVENTION

Field of the Invention

The present invention relates to an agricultural vehicle and in particular to a control device for controlling hydraulic lines connected to functional units of the agricultural vehicle.

Description of Related Art

Agricultural vehicles such as tractors are conveniently provided with multiple hydraulic and electrical connections to the front, middle and/or rear of the vehicle. Various tools or working implements may be attached to the vehicle using these connections. Various control systems for such vehicles are known which enable control of the functionality of the tools or implements attached to the vehicle in this way. Control elements for such systems include joysticks, levers or switch elements. It is known for the hydraulic connections to be colour coded. It is also known for each of the hydraulic connections to include a valve controlled by an associated vehicle control element. For many reasons, a user may wish to lock the vehicle control elements in order to lock the valves against a change from a current setting. For example during driving the vehicle on roads locking the valves can prevent inadvertent movement of an implement attached to the agricultural vehicle. It is known for the control system also to include a terminal incorporating a display, so that a user can use the terminal to lock the vehicle control elements against change from a current setting and this is then also indicated on the display.

Nevertheless, it is a problem that a user cannot determine from viewing of a vehicle control element alone that the vehicle control element has been locked and instead needs to check the terminal display.

It is an advantage of the present invention that it seeks to provide a solution to this problem.

SUMMARY OF THE INVENTION

According to a first aspect of the present invention, a vehicle control device incorporates at least one vehicle control element, at least one control apparatus to lock a functionality of the vehicle control element, the at least one vehicle control element adapted in use to control a valve in a hydraulic line, the at least one vehicle control element is associated with a respective vehicle control display element, the vehicle control display element indicating whether the functionality of the vehicle control element may be altered, characterised in that the vehicle control device further comprises a vehicle terminal, the vehicle terminal incorporating a terminal display separate from the at least one control element and respective vehicle control display element, the terminal display being adapted to indicate the functionality of the or each vehicle control element and whether the functionality of the or each vehicle control element may be altered.

This has as an advantage that the driver when looking at the vehicle control element to operate the vehicle control element can easily see from the associated vehicle control display element whether the functionality of the vehicle control element may be altered. If the vehicle control element is locked against change, the driver may utilise the control apparatus to unlock the functionality of the vehicle control element as appropriate.

Preferably, the vehicle control display associated with the or each of the at least one vehicle control elements displays an individual colour and when the functionality of each vehicle control element is locked against change at least a portion of the associated vehicle control element display is caused to display a different colour indicative of the locking against change.

Preferably, a whole of the vehicle control display element is illuminated in the different colour.

Preferably, the control apparatus comprises one or more controllers, the or each controller being associated with the or each vehicle control element.

Preferably, the control apparatus comprises the terminal.

Preferably, the terminal display includes an information panel associated with each vehicle control element, the information panel displaying a symbol to indicate when the functionality of said vehicle control element may not be altered.

Preferably, both the symbol displayed on the display terminal and at least a part of the vehicle control display element are illuminated in the same colour.

Preferably, the at least one vehicle control element comprises one or more of a plurality of rocker switches, a lever and/or a joystick.

Preferably, the or each display element is illuminated by an LED or OLED.

According to a second aspect of the present invention, an agricultural vehicle comprising a plurality of hydraulic lines each comprising a hydraulic valve and a hydraulic connection, and a vehicle control device according to the first aspect of the invention.

Preferably, each hydraulic connection is provided with a unique colour code.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

In an agricultural vehicle such as a tractor it is known to provide multiple hydraulic and electrical connections to the front, middle and/or rear of the tractor. It is known for the hydraulic connections or couplings to be colour coded. Various tools or working implements may be attached to the vehicle using these connections. Control of the valves associated with these hydraulic connections, and so control of the attached tools or implements, is achieved by way of vehicle control elements located within the operator environment or cabin of the tractor.

Figure 1:
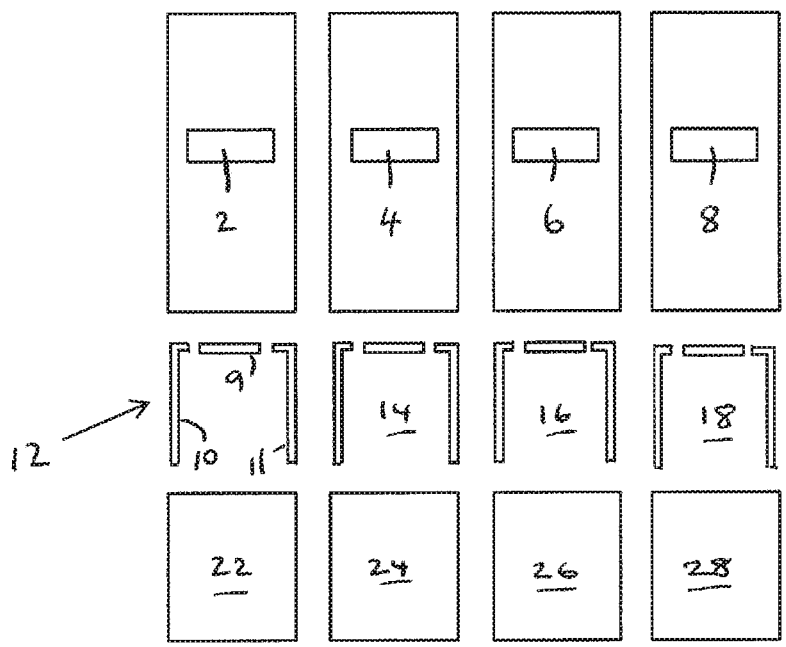
FIG. 1 shows a schematic plan view of a vehicle control device in accordance with the present invention.

With reference to FIG. 1, there can be seen a somewhat schematic plan view of a vehicle control device and in particular a part of a control panel incorporating a plurality of vehicle control elements 2,4,6,8 in which each the of the vehicle control elements 2,4,6,8 are assigned an initial functionality. In the illustrated embodiment the vehicle control elements 2,4,6,8 take the form of four rocker switches 2,4,6,8. Each rocker switch 2,4,6,8 is shown in a neutral floating position and may be moved up or down to actuate a valve to increase or decrease the pressure in the hydraulic line associated with the rocker switch.

The control panel further comprises a vehicle control display 12,14,16,18 associated with each vehicle control element 2,4,6,8. The vehicle control display 12,14,16,18 may be located any suitable position that makes it clear that the vehicle control display 12,14,16,18 relates to a particular vehicle control element 2,4,6,8. In the illustrated embodiment, each vehicle control display 12,14,16,18 is located beneath the vehicle control element 2,4,6,8 with which it is associated.

The vehicle control displays 12,14,16,18 may take any desired form. In the illustrated embodiment, each vehicle control display 12,14,16,18 comprises three elements 9,10, 11: a cross bar 9 and two inverted L-shaped elements 10,11 to each side. Each part of the vehicle control display 12,14,16,18 may be separately illuminated.

In a default configuration, each vehicle control display 12,14,16,18 is illuminated in a unique colour associated with its initial assigned functionality. By way of example, in the illustrated embodiment the first vehicle control display 12 may be illuminated in an orange colour, the second vehicle control display 14 may be illuminated in a purple colour, the third vehicle control display 16 may be illuminated in an olive colour and the fourth vehicle control display 18 may be illuminated in a light blue colour. In the default configuration, the first vehicle control element 2 is adapted to control the valve associated with the hydraulic connection or coupling also coloured orange, the second vehicle control element 4 the hydraulic coupling also coloured purple, the third vehicle control element 6 the hydraulic coupling also coloured olive, and the fourth vehicle control element 8 the hydraulic coupling also coloured light blue. Other vehicle control elements will be associated with a related vehicle control display coloured to correspond to the associated hydraulic connection or coupling as will be discussed below.

Figure 2:
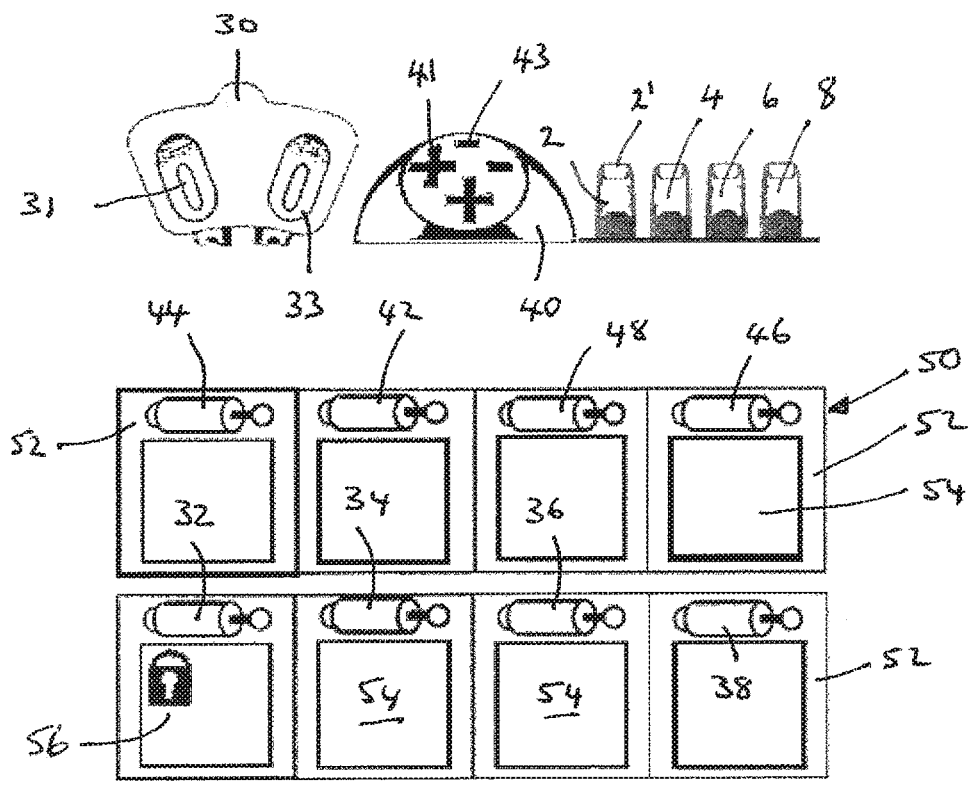
FIG. 2 shows part of a terminal display illustrating the relationship between a plurality of vehicle control elements and associated hydraulic valves.

The configuration of the vehicle control elements and the associated valves is also shown on a separate terminal within the operator environment of the tractor (FIG. 2). The terminal may also be used to alter the configuration of the valves associated with the vehicle control elements. The terminal may also serve as a control apparatus, by providing suitable electronic controllers, for example touch screen buttons, to lock or unlock the functionality of a selected vehicle control element.

Locking of the functionality of a selected vehicle control element may be achieved in any convenient manner. For example, the vehicle control element may be isolated from the valve to prevent movement of the vehicle control element affecting the valve or alternatively the valve may be locked into position to prevent movement of the vehicle control element affecting the valve.

Conveniently, the control panel may further comprise a control apparatus in which individual controllers are provided in the form of a physical switch, such as the push buttons 22,24,26,28, shown in FIG. 1, each push button being associated with each combination of vehicle control element 2,4,6,8 and vehicle control display 12,14,16,18. The push buttons 22,24,26,28 may be used to lock or unlock to lock or unlock the functionality of a selected vehicle control element.

Each form of the control apparatus (the terminal and push buttons) may be used instead of or in addition to the other in order to lock or unlock the valve associated with the relevant hydraulic connection or coupling.

FIG. 2 shows a portion of a terminal display 20, which is separate from the control elements 2,4,6,8 and vehicle control displays 12,14,16,18 and which, on its upper half, shows a number of iconic or symbolic representations of the vehicle control elements 2,4,6,8,30,40 associated with the valves corresponding to the relevant coloured hydraulic connection or coupling. The lower half shows a series of icons 50 each comprising a border region 52 in which is shown an iconic representation of a valve and a panel 54 in which relevant information may be displayed. This information may include whether the valve is set to raise or lower an implement, whether the valve is in a floating condition, or any other desired information regarding the valve. Each icon can be seen to relate to a valve controlled by one of the vehicle control elements shown in symbolic form in the upper half of FIG. 2. Each iconic representation of a valve is conveniently coloured according to the colour of the corresponding vehicle control element. Conveniently the border 52 is also coloured according to the colour of the corresponding vehicle control element.

In the illustrated embodiment, the vehicle control elements represented are a control lever 30 and a cross gate control 40 as well as the four rocker switches 2,4,6,8 of FIG. 1.

It can be seen that in the case of the rocker switches 2,4,6,8 corresponding reference numerals have been used to refer to corresponding parts, for example the same reference numeral 2 is used to refer to the left most rocker switch of FIG. 1 and the left most representation of the rocker switch.

The representation of the first rocker switch 2 includes a marking 2' corresponding to the default orange colour and is associated with a valve coloured orange. The representation of the other rocker switches also carry a marking corresponding to the default colour associated with the corresponding valve.

At the top left of FIG. 2, a representation of a vehicle control element in the form of a lever or joystick 30 includes markings 31,33 corresponding to a default green colour and a default red colour, each associated with a respective green coloured valve 46 and a red coloured valve 48. To the right of this, there is shown a representation of a vehicle control element in the form of a crossgate lever 40 which includes markings 41,43 corresponding to a default blue colour and a default yellow colour, each associated with a respective blue coloured valve 42 and a yellow coloured valve 44.

Similarly, the first green rocker switch 2 is associated with a green valve 32, the second purple rocker switch 4 is associated with a purple valve 34, the third olive rocker switch 6 is associated with an olive valve 36, and the fourth light blue rocker switch 8 is associated with a light blue valve 38.

As noted above, the control apparatus (using either the electronic or physical controllers) may be used to lock one or more of the valves against movement. In the illustrated embodiment, the green valve 32 controlled by the first rocker switch 2 has been locked by actuating the controller 22. This is indicated on the terminal display by the symbol of a lock 56 displayed in the information panel 54 associated with this valve. This is also now indicated in that a part of the vehicle control display element 12, for example the crossbar 9, is now illuminated in a unique colour to signal that the corresponding valve is now locked. In an alternative embodiment, the whole of the vehicle control display element 12 is now illuminated in a unique colour. In a preferred embodiment, both the lock symbol on the display terminal and (at least a part of) the vehicle control display element 12 are illuminated in the same unique colour.

From reading the present disclosure, other modifications will be apparent to persons skilled in the art. Such modifications may involve other features which are already known and component parts therefore and which may be used instead of or in addition to features already described herein.

The invention claimed is:

1. A vehicle control device incorporates at least one vehicle control element, at least one control apparatus to lock a functionality of the vehicle control element, the at least one vehicle control element adapted in use to control a valve in a hydraulic line, the at least one vehicle control element is associated with a respective vehicle control display element, the vehicle control display element indicating whether the functionality of the vehicle control element may be altered, wherein the vehicle control device further includes a vehicle terminal, the vehicle terminal incorporating a terminal display separate from the at least one control element and respective vehicle control display element, the terminal display being adapted to indicate the functionality of the or each vehicle control element and whether the functionality of the or each vehicle control element may be altered, wherein the terminal display includes an information panel associated with each vehicle control element, the information panel displaying a symbol to indicate when the functionality of said vehicle control element may not be altered, wherein both the symbol displayed on the display terminal and at least a part of the vehicle control display element are illuminated in the same color.

2. The vehicle control device according to claim 1, wherein the vehicle control display associated with the or each of the at least one vehicle control elements displays an individual colour and when the functionality of each vehicle control element is locked against change at least a portion of the associated vehicle control element display is caused to display a different colour indicative of the locking against change.

3. The vehicle control device according to claim 2, wherein a whole of the vehicle control display element is illuminated in the different colour.

4. The vehicle control device according to claim 1, wherein the control apparatus includes one or more controllers, the or each controller being associated with the or each vehicle control element.

5. The vehicle control device according to claim 1, wherein the control apparatus includes the terminal.

6. The vehicle control device according to claim 1, wherein the at least one vehicle control element includes one or more of a plurality of rocker switches, a lever and/or a joystick.

7. The vehicle control device according to claim 1, wherein the or each display element is illuminated by an LED or OLED.

* * * * *